United States Patent
Mei et al.

(10) Patent No.: US 10,154,379 B2
(45) Date of Patent: Dec. 11, 2018

(54) ARTIFICIAL INTELLIGENCE FOR LOSS PREVENTION TAGS

(71) Applicant: Informu Inc., Boulder, CO (US)

(72) Inventors: Shuliang Mei, Boulder, CO (US);
Rishabh Berlia, Boulder, CO (US);
Raza Qazi, Boulder, CO (US)

(73) Assignee: Informu Inc.

( * ) Notice: Subject to any disclaimer, the term of this patent is extended or adjusted under 35 U.S.C. 154(b) by 0 days.

(21) Appl. No.: 15/811,325

(22) Filed: Nov. 13, 2017

(65) Prior Publication Data
US 2018/0152809 A1 May 31, 2018

Related U.S. Application Data

(60) Provisional application No. 62/426,509, filed on Nov. 26, 2016.

(51) Int. Cl.
| | |
|---|---|
| *H04W 68/00* | (2009.01) |
| *H04W 4/02* | (2018.01) |
| *H01Q 1/22* | (2006.01) |
| *G06F 15/18* | (2006.01) |
| *H04L 29/08* | (2006.01) |
| *G08B 21/00* | (2006.01) |

(52) U.S. Cl.
CPC ............ *H04W 4/023* (2013.01); *G06F 15/18* (2013.01); *G08B 21/00* (2013.01); *H01Q 1/2225* (2013.01); *H04L 67/22* (2013.01); *H04W 68/00* (2013.01)

(58) Field of Classification Search
CPC ....... H04W 4/02; H04W 4/023; H04W 68/00; G06F 15/18; H04L 67/22; H01Q 1/2225
See application file for complete search history.

(56) References Cited

U.S. PATENT DOCUMENTS

2015/0156567 A1\* 6/2015 Oliver .................... H04W 4/80
340/870.07

\* cited by examiner

*Primary Examiner* — Chuong A Ngo
(74) *Attorney, Agent, or Firm* — Michael Carey (57) ABSTRACT

Methods, systems, and devices for preventing the loss of valuable items using beacon notifications are described. A loss prevention tag is a small, discreet electronic tag which can be attached to belongings in order to prevent them from being lost. The tag may communicate with a computer or mobile device (e.g., a smartphone or a smartwatch) and may transmit a notification when the object it is attached to moves beyond a threshold distance from the device it is communicating with. A loss prevention tag system may utilize a system of smart notifications. One function of the smart notification system is to remove false alarm notifications. Another function of the smart notification system may be to modify the mode or format of the notification.

17 Claims, 10 Drawing Sheets

ARTIFICIAL INTELLIGENCE FOR LOSS PREVENTION TAGS

CROSS-REFERENCE TO RELATED APPLICATION(S)

This application claims priority to provisional application No. 62/426,509 to Mei et al., entitled 'informu Inc. products: hardware device (µ tag) and software', which is expressly incorporated by reference herein in its entirety.

BACKGROUND

The following relates generally to preventing the loss of valuable items, and more specifically to preventing the loss of valuable items using beacon notifications.

Small electronic circuits may be attached to valuable items in order to track these items. However, people may still lose track of these items and recovering them may be costly or impossible even if the location is known. This may cause the owner of the item to experience inconvenience as well as emotional and financial loss. Thus, a system that helps prevent the loss of valuable items may be desired.

SUMMARY

A loss prevention tag is a small, discreet electronic tag which can be attached to belongings in order to prevent them from being lost. The tag may communicate with a computer or mobile device (e.g., a smartphone or a smartwatch) and may transmit a notification when the object it is attached to moves beyond a threshold distance from the device it is communicating with. A loss prevention tag system may utilize a system of smart notifications. One function of the smart notification system is to remove false alarm notifications. Another function of the smart notification system may be to modify the mode, format, or content of the notification (e.g., provide a list of recommended items to bring to an event).

In one embodiment, a method may include receiving a beacon notification from a loss prevention tag indicating the loss prevention tag is more than a threshold distance away from a receiving device, identifying one or more user notification parameters, and generating an alert based at least in part on the beacon notification and the user notification parameters.

In one embodiment, a non-transitory computer-readable medium may include instructions operable to cause a processor to receive a beacon notification from a loss prevention tag indicating the loss prevention tag is more than a threshold distance away from a receiving device, identify one or more user notification parameters, and generate an alert based at least in part on the beacon notification and the user notification parameters.

In one embodiment, an apparatus may include a processor, memory in electronic communication with the processor, and instructions stored in the memory. The instructions may be operable to cause the processor to receive a beacon notification from a loss prevention tag indicating the loss prevention tag is more than a threshold distance away from a receiving device, identify one or more user notification parameters, and generate an alert based at least in part on the beacon notification and the user notification parameters.

In one embodiment, an apparatus may include means for receiving a beacon notification from a loss prevention tag indicating the loss prevention tag is more than a threshold distance away from a receiving device, means for identifying one or more user notification parameters, and means for generating an alert based at least in part on the beacon notification and the user notification parameters.

Some examples of the method, non-transitory computer-readable medium, and apparatus described above may further include processes, features, means, or instructions for collecting user behavioral information from the receiving device of a user. Some examples of the method, non-transitory computer-readable medium, and apparatus described above may further include processes, features, means, or instructions for updating a dynamic user parameter for the user based on the collected user information and a machine learning algorithm, wherein the user notification parameters include the dynamic user parameter.

Some examples of the method, non-transitory computer-readable medium, and apparatus described above may further include processes, features, means, or instructions for collecting user information from a plurality of registered users of a loss prevention system. Some examples of the method, non-transitory computer-readable medium, and apparatus described above may further include processes, features, means, or instructions for generating a group parameter based on the collected user information, wherein the user notification parameters include the group parameter.

Some examples of the method, non-transitory computer-readable medium, and apparatus described above may further include processes, features, means, or instructions for determining an identifier of the loss prevention tag based on the beacon notification, wherein the alert may be based at least in part on the identifier.

Some examples of the method, non-transitory computer-readable medium, and apparatus described above may further include processes, features, means, or instructions for triggering a notification system of the receiving device based on the alert. Some examples of the method, non-transitory computer-readable medium, and apparatus described above may further include processes, features, means, or instructions for displaying the alert to a user of the receiving device. Some examples of the method, non-transitory computer-readable medium, and apparatus described above may further include processes, features, means, or instructions for refraining from notifying a user based at least in part on the beacon notification and the notification parameters.

In some examples of the method, non-transitory computer-readable medium, and apparatus described above, the user notification parameters include current location information, safe location information, user calendar information, event type, item classification, map data, operational mode information, distance parameters, use frequency information, information regarding combinations of items, or any combination thereof.

DETAILED DESCRIPTION

A loss prevention tag is a flexible, wearable, customizable technology that addresses three kinds of loss: misplaced, stolen and forgotten items. The loss prevention tag may implement a radio beacon to alert users when the tag is beyond a threshold distance away. Thus, the loss prevention tag system is not just a tool to find things, but a new way to organize personal belongings. The loss prevention tag may communicate with a mobile app, which in turn may send notifications to a smart phone or other mobile device such as a smart watch. The loss prevention tag may include a removable and rechargeable battery to increase the useful life of the tag.

The loss prevention system may utilize machine learning algorithms to predict behavior, prevent false alarms, and provide smart notifications regarding the presence or absence of desired items. For example, the loss prevention tag system may identify an event based on past behavior, calendars and other parameters, and learn what items are typically taken along for an event of that category. In another example, the loss prevention tag system may identify a risk level of a location, and filter notifications based on the risk level.

Figure 1:
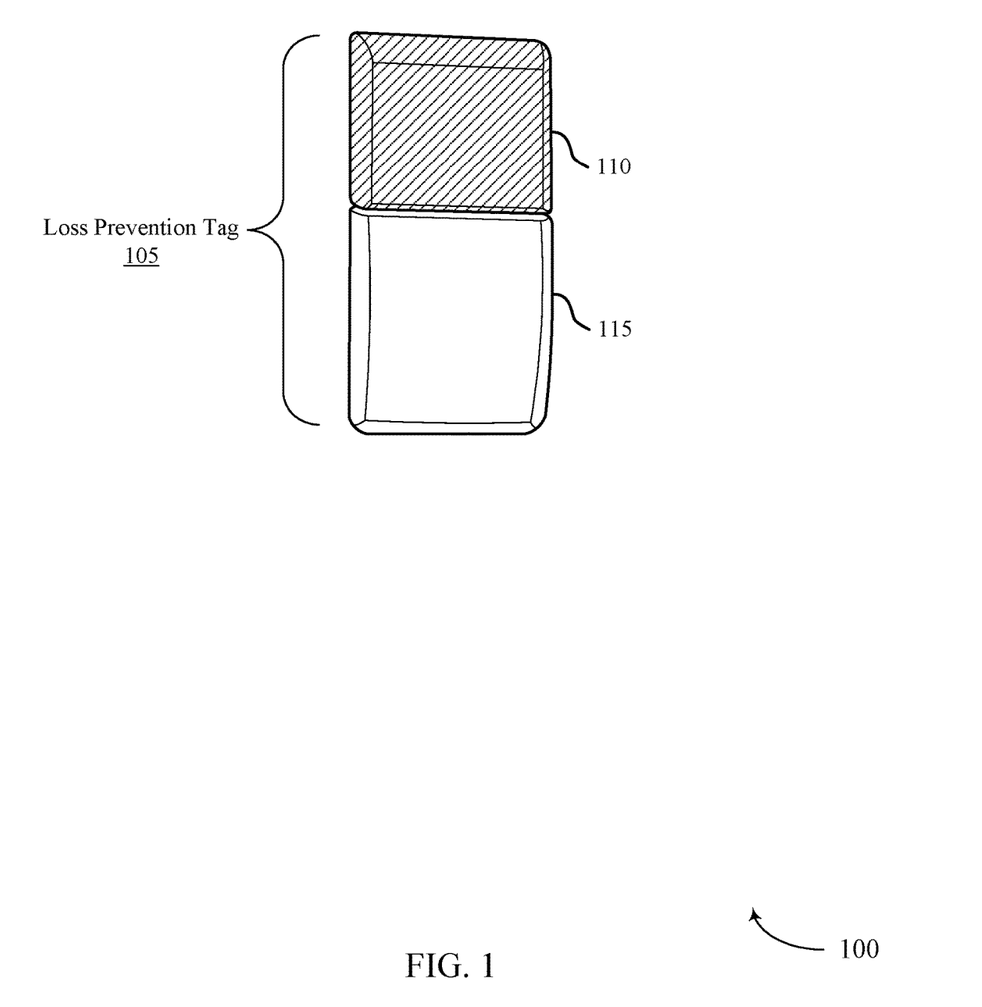
FIG. 1 shows a diagram of a loss prevention tag that supports preventing the loss of valuable items using beacon notifications in accordance with aspects of the present disclosure.

FIG. 1 shows a diagram 100 of a loss prevention tag 105 that supports preventing the loss of valuable items using beacon notifications in accordance with aspects of the present disclosure.

Loss prevention tag 105 may be a small, discreet electronic tag which can be attached to belongings in order to prevent them from being lost. For example, the loss prevention tag 105 may be attached to an item such as: a purse, keys, a mobile computing device, a camera, medication, a wallet, a car, a bike, a notebook, headphones, glasses, luggage, a bike, a backpack, a water bottle, a child (e.g., via the child's clothing), or pets. In some cases, the loss prevention tag 105 may be composed of two modules: a main micro-module, and an interchangeable and rechargeable battery module. In some cases, the battery unit may be a lithium ion or lithium polymer battery unit. Anode materials may include zinc or lithium or another suitable material. Cathode materials may include manganese dioxide, silver oxide, carbon monofluoride, cupric oxide, oxygen or another suitable material. The loss prevention tag 105 may have a thin and flexible form factor, and may include a low energy beacon.

Loss prevention tag 105 may incorporate aspects of loss prevention tag 205 as described with reference to FIG. 2. In some examples, loss prevention tag 105 may include microcontroller component 110 and battery component 115.

Figure 2:
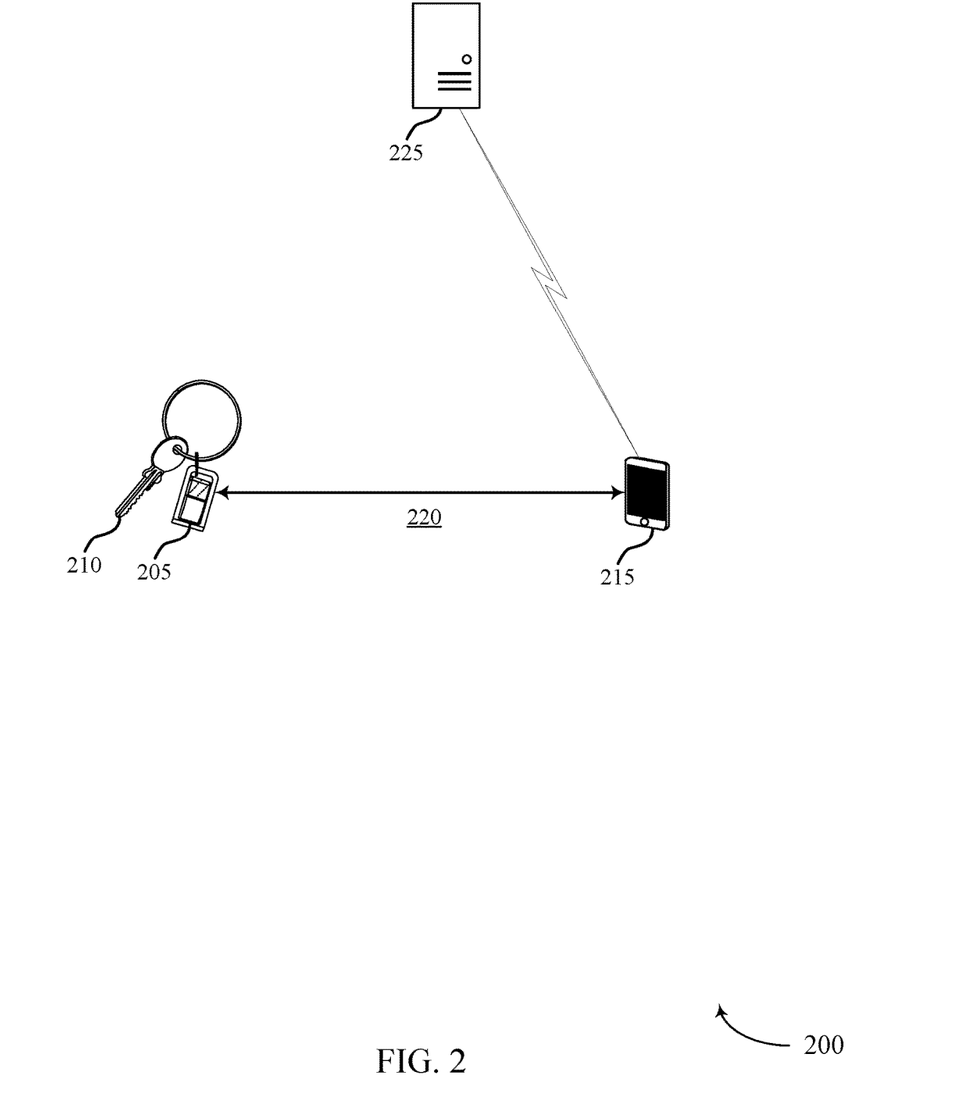
FIG. 2 shows a diagram of a loss prevention tag system that supports preventing the loss of valuable items using beacon notifications in accordance with aspects of the present disclosure.

FIG. 2 shows a diagram 200 of a loss prevention tag 205 system that supports preventing the loss of valuable items 210 using beacon notifications in accordance with aspects of the present disclosure. Diagram 200 may include loss prevention tag 205, valuable item 210, loss prevention device 215, threshold distance 220, and loss prevention server 225. Loss prevention tag 205 may incorporate aspects of loss prevention tag 105 as described with reference to FIG. 1. Loss prevention device 215 may incorporate aspects of loss prevention device 305 as described with reference to FIG. 3.

A loss prevention tag 205 may communicate with a computer or mobile device (e.g., a smartphone or a smartwatch) and may transmit a notification when the object it is attached to moves beyond a threshold distance 220 from the loss prevention device 215 it is communicating with. Software for the lass prevention tag may be loaded on the loss prevention device 215, and may include additional parameters for processing the notifications such as safe places, time periods, identification information for different low prevention tags, and other parameters. The loss prevention tag 205 application enables configuration and management of a number of registered tags all your tags. The loss prevention tag 205 application may also access a calendar to provide notifications of items that may be needed for particular events.

A loss prevention tag 205 may be small in size to reduce bulkiness of items while maintaining superior theft and loss prevention. It may have the ability to send notifications even if the receiving mobile device is closed, which can reduce hassle, while giving ease of mind about a consumer's belongings. It may run efficiently preserving both tag and mobile device battery life, so that it can keep track of items while conserving the ability to use the phone longer for other activities throughout the day. It may employ machine learning algorithm to adapt to user behavior, providing peace of mind with effortless item tracking and protection. It may include a rechargeable battery, which may eliminate worries about swapping out old tags.

A loss prevention tag 205 system may be available in various product colors to match personal style. It may integrate with wearable devices such as smart watches to ensure even more rapid notifications. It may utilize a reusable adhesive, to increase the useable lifetime of each tag. A loss prevention may also include a charging device, which may plug in to a wall outlet or a USB port. A loss prevention tag 205 system may utilize a system of smart notifications. A smart notification system may employ a deep learning model which uses parameters like distance, type of object, registered safe locations, current location, and frequency of use with other tags to generate, present, and filter notifications. Additionally, the system may integrate email data, calendar events, and map data to further curate the types of notification users receive.

One function of the smart notification system is to remove false alarm notifications. For example, if a user is hanging out in a bar (i.e., leaving a location not marked as a safe location) the loss prevention tag application may notify the user if they leave an item behind. However, if a user steps out of their office for lunch (i.e., leaving a programmed or learned safe location), the loss prevention tag application may refrain from sending a notification. In another case, if a user has an upcoming flight scheduled in their calendar, the loss prevention tag application may send a notification reminding the user what belongings to bring for travel (e.g., phone, wallet, passport, etc.) and may make suggestions regarding weather with the use of forecast data in the area to or from which the user is traveling.

Use of a loss prevention tag system may include the following steps. First, a user may place the loss prevention tag 205 on an item that they wish to track. Second, the loss prevention tag application will pair with the loss prevention tag 205 and begin notifying the user when become separated from it. Third, using a machine learning algorithm, the loss prevention tag 205 application may create more individualized notifications and a predictive loss prevention experience Loss prevention device 215 may be a computing device, a mobile device, a smartphone, or any other suitable communications device. Loss prevention device 215 may include a loss prevention application, i.e. a software or hardware application for processing beacon notifications from a loss prevention tag 205 and notifying a user.

Loss prevention server 225 may collect user information from a plurality of registered users of a loss prevention system and generate a group parameter based on the collected user information, wherein the user notification parameters include the group parameter. In some cases, these functions may also be performed by the Loss prevention device 215.

Figure 3:
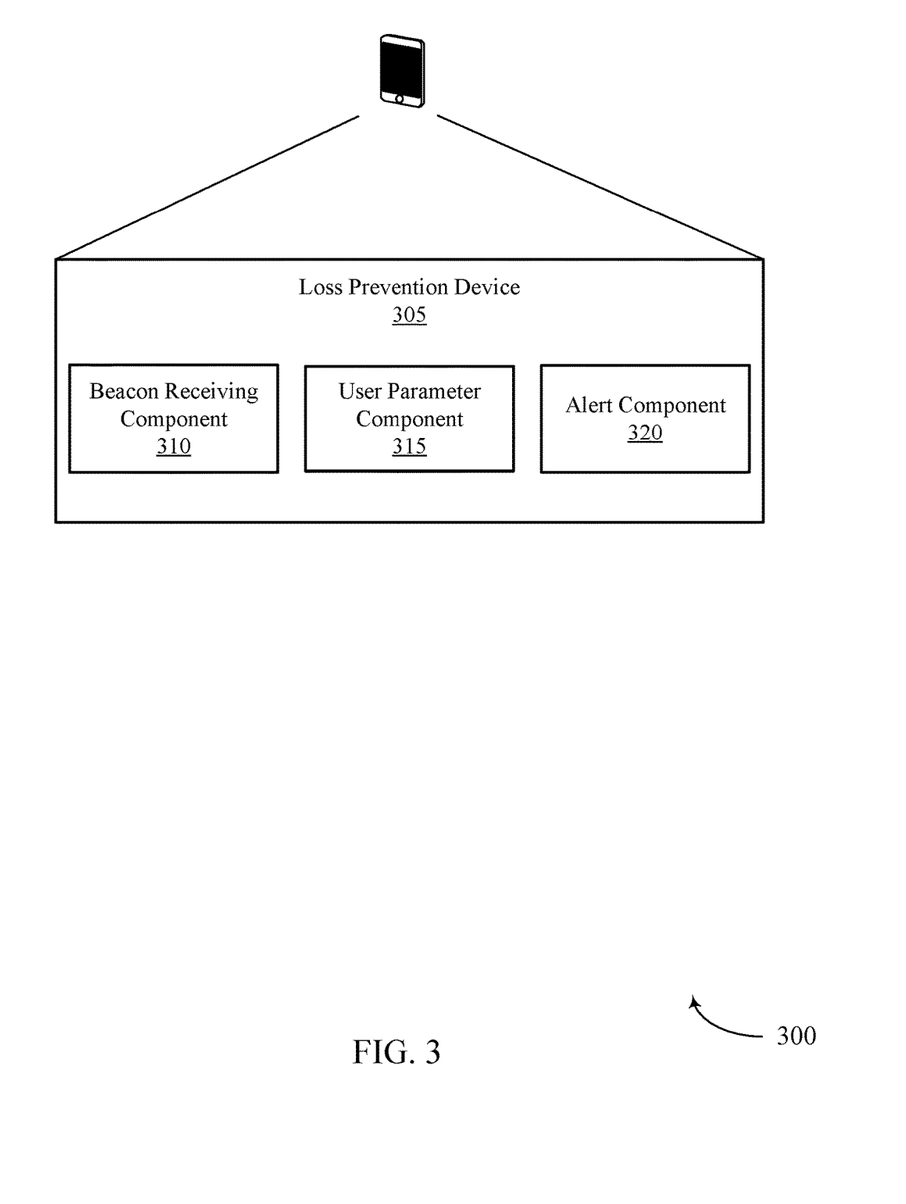
FIG. 3 shows a diagram of a loss prevention device that supports preventing the loss of valuable items using beacon notifications in accordance with aspects of the present disclosure.

FIG. 3 shows a diagram 300 of a loss prevention device 305 that supports preventing the loss of valuable items using beacon notifications in accordance with aspects of the present disclosure.

Loss prevention device 305 may incorporate aspects of loss prevention device 215 as described with reference to FIG. 2. In some examples, loss prevention device 305 may include beacon receiving component 310, user parameter component 315, and alert component 320.

Beacon receiving component 310 may receive a beacon notification from a loss prevention tag indicating the loss prevention tag is more than a threshold distance away from a receiving device and determine an identifier of the loss prevention tag based on the beacon notification, wherein the alert is based at least in part on the identifier.

User parameter component 315 may identify one or more user notification parameters; collect user behavioral information from the receiving device of a user; and update a dynamic user parameter for the user based on the collected user information and a machine learning algorithm, wherein the user notification parameters include the dynamic user parameter. In some cases, the user notification parameters include current location information, safe location information, user calendar information, event type, item classification, map data, operational mode information, distance parameters, use frequency information, information regarding combinations of items, or any combination thereof.

Alert component 320 may generate an alert based at least in part on the beacon notification and the user notification parameters; trigger a notification system of the receiving device based on the alert; display the alert to a user of the receiving device; and refrain from notifying a user based at least in part on the beacon notification and the notification parameters.

Figure 4:
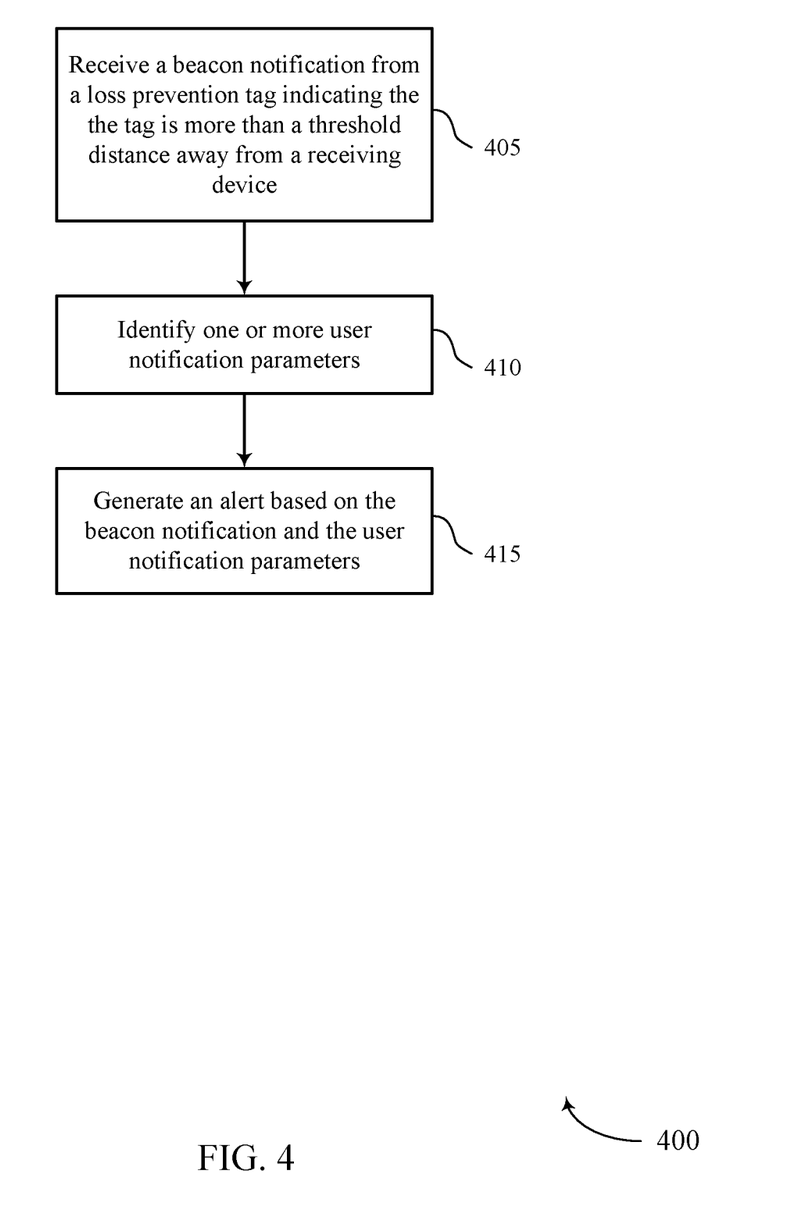
FIGS. 4 through 10 show flowcharts of a process for preventing the loss of valuable items using beacon notifications in accordance with aspects of the present disclosure.

FIG. 4 shows a flowchart 400 of a process for preventing the loss of valuable items using beacon notifications in accordance with aspects of the present disclosure. In some examples, a flowchart may execute a set of codes to control functional elements of the flowchart to perform the described functions. Additionally or alternatively, a flowchart may use special-purpose hardware.

At block 405 the flowchart may receive a beacon notification from a loss prevention tag indicating the tag is more than a threshold distance away from a receiving device. These operations may be performed according to the methods and processes described in accordance with aspects of the present disclosure. For example, the operations may be composed of various substeps, or may be performed in conjunction with other operations described herein. In certain examples, aspects of the described operations may be performed by beacon receiving component 310 as described with reference to FIG. 3.

At block 410 the flowchart may identify one or more user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 415 the flowchart may generate an alert based at least in part on the beacon notification and the user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

Figure 5:
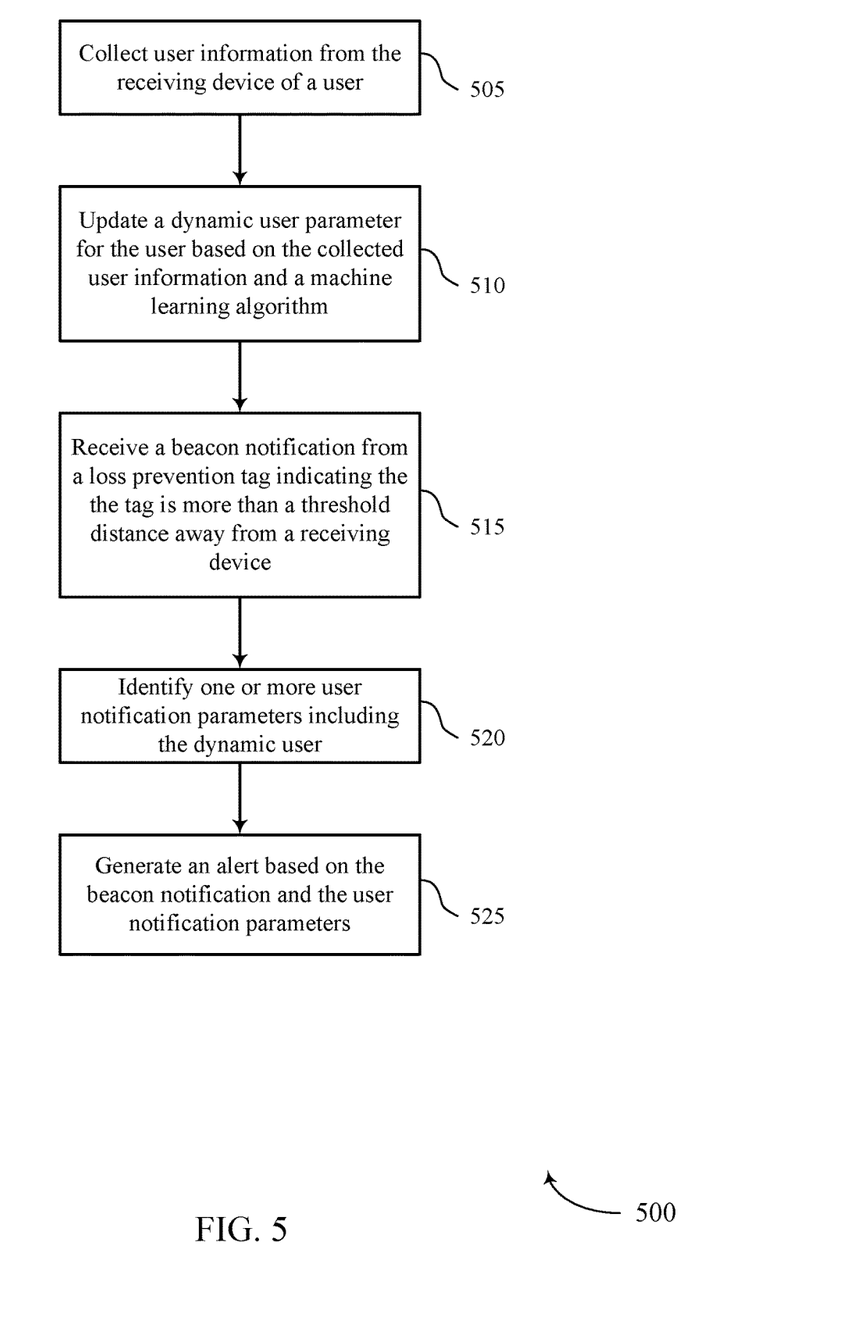

FIG. 5 shows a flowchart 500 of a process for preventing the loss of valuable items using beacon notifications in accordance with aspects of the present disclosure. In some examples, a flowchart may execute a set of codes to control functional elements of the flowchart to perform the described functions. Additionally or alternatively, a flowchart may use special-purpose hardware.

At block 505 the flowchart may collect user information from the receiving device of a user. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 510 the flowchart may update a dynamic user parameter for the user based on the collected user information and a machine learning algorithm. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 515 the flowchart may receive a beacon notification from a loss prevention tag indicating the tag is more than a threshold distance away from a receiving device. These operations may be performed according to the methods and processes described in accordance with aspects of the present disclosure. For example, the operations may be composed of various substeps, or may be performed in conjunction with other operations described herein. In certain examples, aspects of the described operations may be performed by beacon receiving component 310 as described with reference to FIG. 3.

At block 520 the flowchart may identify one or more user notification parameters including the dynamic user. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 525 the flowchart may generate an alert based at least in part on the beacon notification and the user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

Figure 6:
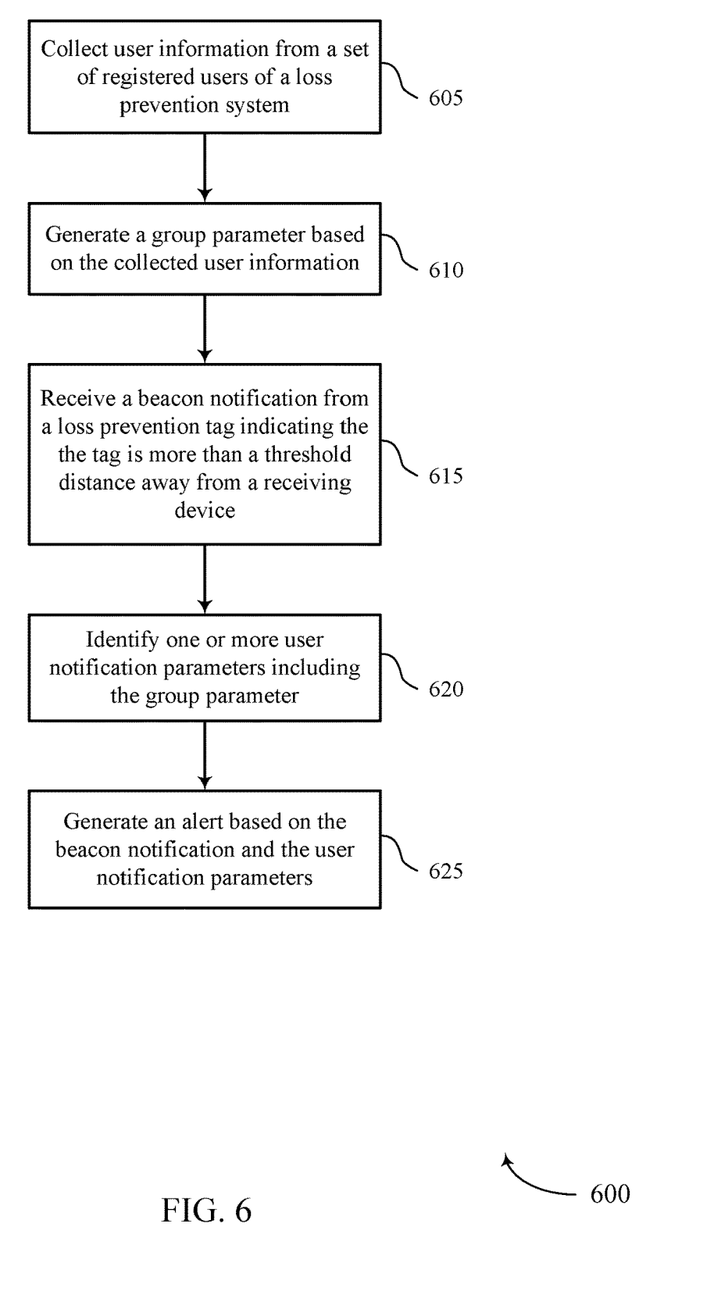

FIG. 6 shows a flowchart 600 of a process for preventing the loss of valuable items using beacon notifications in accordance with aspects of the present disclosure. In some examples, a flowchart may execute a set of codes to control functional elements of the flowchart to perform the described functions. Additionally or alternatively, a flowchart may use special-purpose hardware.

At block 605 the flowchart may collect user information from a plurality of registered users of a loss prevention system. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 610 the flowchart may generate a group parameter based on the collected user information. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 615 the flowchart may receive a beacon notification from a loss prevention tag indicating the tag is more than a threshold distance away from a receiving device. These operations may be performed according to the methods and processes described in accordance with aspects of the present disclosure. For example, the operations may be composed of various substeps, or may be performed in conjunction with other operations described herein. In certain examples, aspects of the described operations may be performed by beacon receiving component 310 as described with reference to FIG. 3.

At block 620 the flowchart may identify one or more user notification parameters including the group parameter. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 625 the flowchart may generate an alert based at least in part on the beacon notification and the user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

Figure 7:
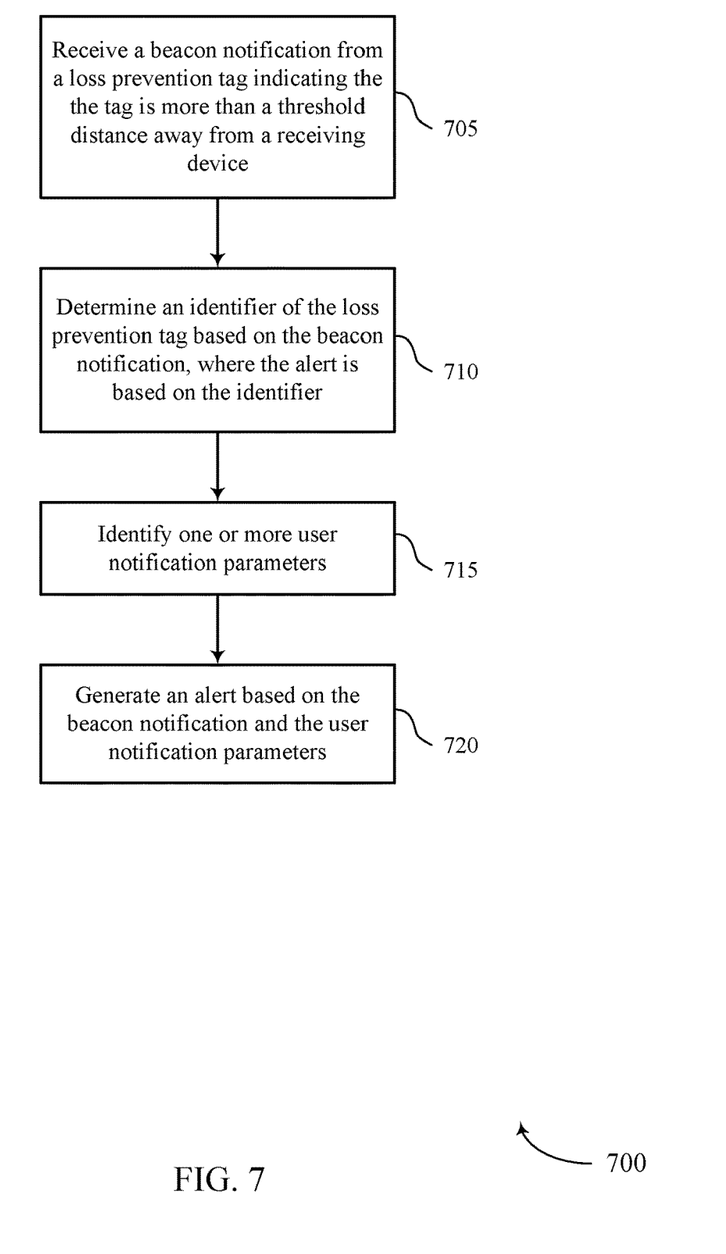

FIG. 7 shows a flowchart 700 of a process for preventing the loss of valuable items using beacon notifications in accordance with aspects of the present disclosure. In some examples, a flowchart may execute a set of codes to control functional elements of the flowchart to perform the described functions. Additionally or alternatively, a flowchart may use special-purpose hardware.

At block 705 the flowchart may receive a beacon notification from a loss prevention tag indicating the tag is more than a threshold distance away from a receiving device. These operations may be performed according to the methods and processes described in accordance with aspects of the present disclosure. For example, the operations may be composed of various substeps, or may be performed in conjunction with other operations described herein. In certain examples, aspects of the described operations may be performed by beacon receiving component 310 as described with reference to FIG. 3.

At block 710 the flowchart may determine an identifier of the loss prevention tag based on the beacon notification, wherein the alert is based at least in part on the identifier. These operations may be performed according to the methods and processes described in accordance with aspects of the present disclosure. For example, the operations may be composed of various substeps, or may be performed in conjunction with other operations described herein. In certain examples, aspects of the described operations may be performed by beacon receiving component 310 as described with reference to FIG. 3.

At block 715 the flowchart may identify one or more user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 720 the flowchart may generate an alert based at least in part on the beacon notification and the user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

Figure 8:
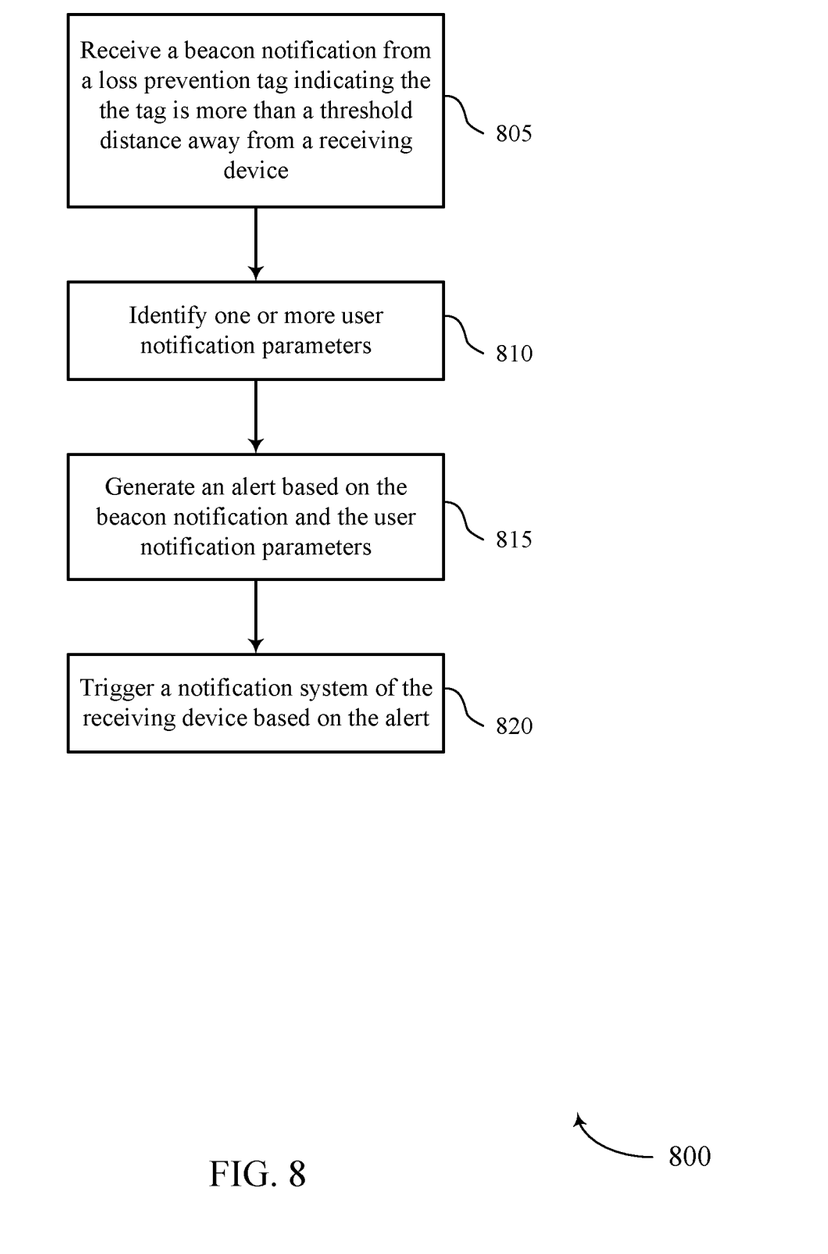

FIG. 8 shows a flowchart 800 of a process for preventing the loss of valuable items using beacon notifications in accordance with aspects of the present disclosure. In some examples, a flowchart may execute a set of codes to control functional elements of the flowchart to perform the described functions. Additionally or alternatively, a flowchart may use special-purpose hardware.

At block 805 the flowchart may receive a beacon notification from a loss prevention tag indicating the tag is more than a threshold distance away from a receiving device. These operations may be performed according to the methods and processes described in accordance with aspects of the present disclosure. For example, the operations may be composed of various substeps, or may be performed in conjunction with other operations described herein. In certain examples, aspects of the described operations may be performed by beacon receiving component 310 as described with reference to FIG. 3.

At block 810 the flowchart may identify one or more user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 815 the flowchart may generate an alert based at least in part on the beacon notification and the user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

At block 820 the flowchart may trigger a notification system of the receiving device based on the alert. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

Figure 9:
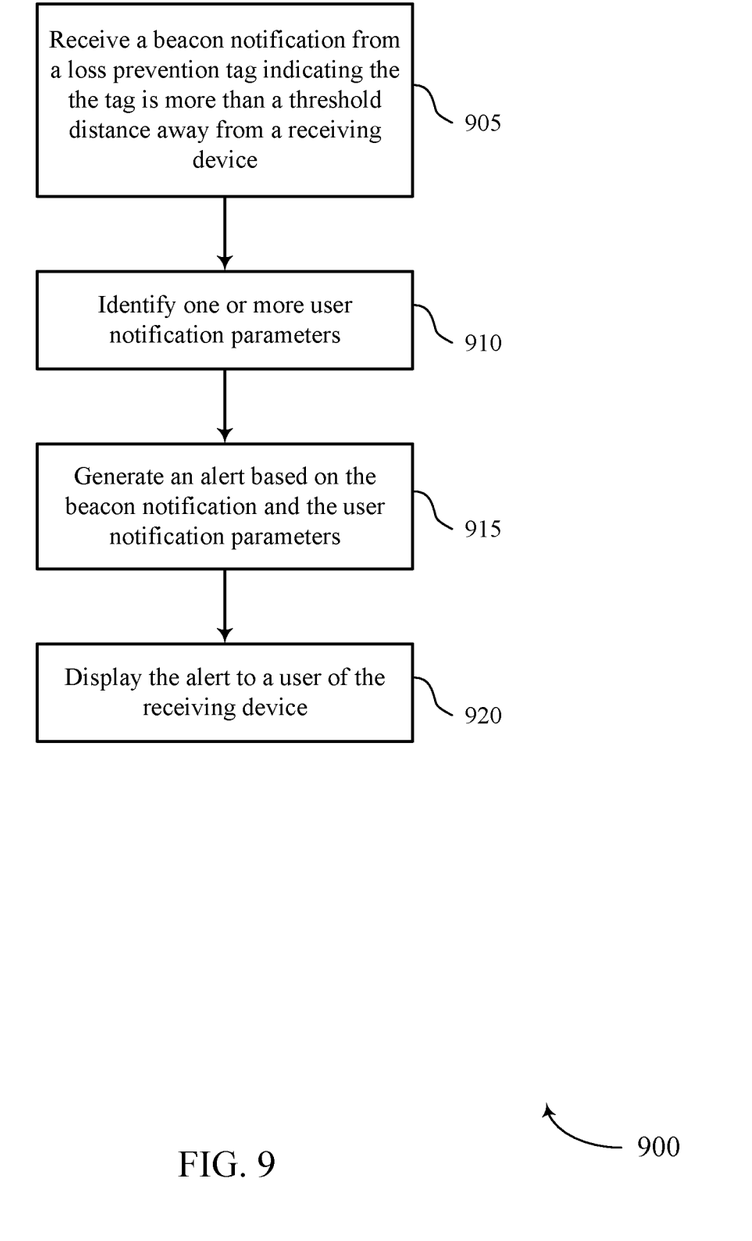

FIG. 9 shows a flowchart 900 of a process for preventing the loss of valuable items using beacon notifications in accordance with aspects of the present disclosure. In some examples, a flowchart may execute a set of codes to control functional elements of the flowchart to perform the described functions. Additionally or alternatively, a flowchart may use special-purpose hardware.

At block 905 the flowchart may receive a beacon notification from a loss prevention tag indicating the tag is more than a threshold distance away from a receiving device. These operations may be performed according to the methods and processes described in accordance with aspects of the present disclosure. For example, the operations may be composed of various substeps, or may be performed in conjunction with other operations described herein. In certain examples, aspects of the described operations may be performed by beacon receiving component 310 as described with reference to FIG. 3.

At block 910 the flowchart may identify one or more user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 915 the flowchart may generate an alert based at least in part on the beacon notification and the user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

At block 920 the flowchart may display the alert to a user of the receiving device. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

Figure 10:
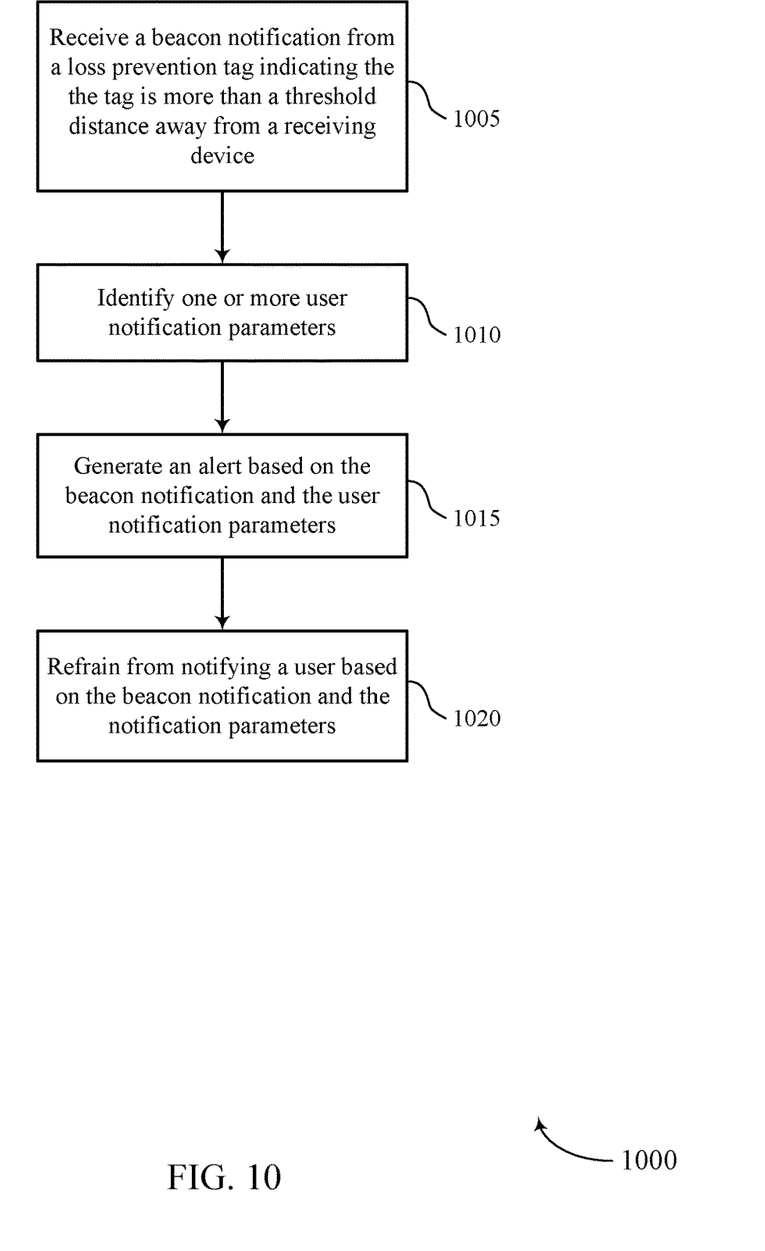

FIG. 10 shows a flowchart 1000 of a process for preventing the loss of valuable items using beacon notifications in accordance with aspects of the present disclosure. In some examples, a flowchart may execute a set of codes to control functional elements of the flowchart to perform the described functions. Additionally or alternatively, a flowchart may use special-purpose hardware.

At block 1005 the flowchart may receive a beacon notification from a loss prevention tag indicating the tag is more than a threshold distance away from a receiving device. These operations may be performed according to the methods and processes described in accordance with aspects of the present disclosure. For example, the operations may be composed of various substeps, or may be performed in conjunction with other operations described herein. In certain examples, aspects of the described operations may be performed by beacon receiving component 310 as described with reference to FIG. 3.

At block 1010 the flowchart may identify one or more user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by user parameter component 315 as described with reference to FIG. 3.

At block 1015 the flowchart may generate an alert based at least in part on the beacon notification and the user notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

At block 1020 the flowchart may refrain from notifying a user based at least in part on the beacon notification and the notification parameters. These operations may be performed according to the methods and processes described in accordance with aspects of the present disclosure. For example, the operations may be composed of various substeps, or may be performed in conjunction with other operations described herein. In certain examples, aspects of the described operations may be performed by alert component 320 as described with reference to FIG. 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a DSP, an ASIC, an FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read only memory (EEPROM), compact disk (CD) ROM or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, digital subscriber line (MIA or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase, "based on" shall be construed to mean "based at least in part on."

What is claimed is:

1. A method for preventing the loss of valuable items, comprising:
    collecting user behavioral information from a receiving device of a user;
    updating a dynamic user parameter for the user based on the collected user information and a machine learning algorithm;
    receiving a beacon notification from a loss prevention tag indicating the loss prevention tag is more than a threshold distance away from the receiving device;
    identifying one or more user notification parameters, wherein the user notification parameters include the dynamic user parameter; and
    generating an alert based at least in part on the beacon notification and the user notification parameters.

2. The method of claim 1, further comprising:
    collecting user information from a plurality of registered users of a loss prevention system; and
    generating a group parameter based on the collected user information, wherein the user notification parameters include the group parameter.

3. The method of claim 1, further comprising:
    determining an identifier of the loss prevention tag based on the beacon notification, wherein the alert is based at least in part on the identifier.

4. The method of claim 1, further comprising:
    triggering a notification system of the receiving device based on the alert.

5. The method of claim 1, further comprising:
    displaying the alert to a user of the receiving device.

6. The method of claim 1, further comprising:
    refraining from notifying a user based at least in part on the beacon notification and the notification parameters.

7. The method of claim 1, wherein:
    the user notification parameters include current location information, safe location information, user calendar information, event type, item classification, map data, operational mode information, distance parameters, use frequency information, information regarding combinations of items, or any combination thereof.

8. A non-transitory computer readable medium storing code for preventing the loss of valuable items, the code comprising instructions executable by a processor to:
    collect user behavioral information from a receiving device of a user;
    update a dynamic user parameter for the user based on the collected user information and a machine learning algorithm;
    receive a beacon notification from a loss prevention tag indicating the loss prevention tag is more than a threshold distance away from the receiving device;
    identify one or more user notification parameters, wherein the user notification parameters include the dynamic user parameter; and
    generate an alert based at least in part on the beacon notification and the user notification parameters.

9. The non-transitory computer-readable medium of claim 8, wherein the code further comprises instructions executable by the processor to:
    determine an identifier of the loss prevention tag based on the beacon notification, wherein the alert is based at least in part on the identifier.

10. The non-transitory computer-readable medium of claim 8, wherein the code further comprises instructions executable by the processor to:
    trigger a notification system of the receiving device based on the alert.

11. The non-transitory computer-readable medium of claim 8, wherein the code further comprises instructions executable by the processor to:
    display the alert to a user of the receiving device.

12. The non-transitory computer-readable medium of claim 8, wherein the code further comprises instructions executable by the processor to:
    refrain from notifying a user based at least in part on the beacon notification and the notification parameters.

13. An apparatus for preventing the loss of valuable items, comprising:
    a processor; and
    a memory storing instructions and in electronic communication with the processor, the processor being configured to execute the instructions to:
        collect user behavioral information from a receiving device of a user;
        update a dynamic user parameter for the user based on the collected user information and a machine learning algorithm;

receive a beacon notification from a loss prevention tag indicating the loss prevention tag is more than a threshold distance away from the receiving device;

identify one or more user notification parameters, wherein the user notification parameters include the dynamic user parameter; and generate an alert based at least in part on the beacon notification and the user notification parameters.

14. The apparatus of claim 13, wherein processor is further configured to execute the instructions to:

determine an identifier of the loss prevention tag based on the beacon notification, wherein the alert is based at least in part on the identifier.

15. The apparatus of claim 13, wherein processor is further configured to execute the instructions to:

trigger a notification system of the receiving device based on the alert.

16. The apparatus of claim 13, wherein processor is further configured to execute the instructions to:

display the alert to a user of the receiving device.

17. The apparatus of claim 13, wherein processor is further configured to execute the instructions to:

refrain from notifying a user based at least in part on the beacon notification and the notification parameters.

* * * * *